United States Patent [19]

Takagi

[11] Patent Number: 5,159,479
[45] Date of Patent: Oct. 27, 1992

[54] PRIVATE BRANCH RADIO COMMUNICATION SYSTEM USING OPTICAL FIBERS

[75] Inventor: Tasuku Takagi, Sendai, Japan

[73] Assignee: Small Power Communication Systems Research Laboratories Co., Ltd., Sendai, Japan

[21] Appl. No.: 845,356

[22] Filed: Mar. 5, 1992

Related U.S. Application Data

[63] Continuation of Ser. No. 367,315, Jun. 16, 1989, abandoned.

[30] Foreign Application Priority Data

Jun. 17, 1988 [JP] Japan .................. 63-148237

[51] Int. Cl.⁵ .......................... H04B 10/02
[52] U.S. Cl. .................... 359/174; 359/113; 359/124; 359/152
[58] Field of Search ........ 359/113, 115, 124, 145–146, 359/152, 154, 173–174, 176, 179; 370/35, 75; 375/3

[56] References Cited

U.S. PATENT DOCUMENTS

| | | | |
|---|---|---|---|
| 4,539,706 | 9/1985 | Mears | 455/11.1 |
| 4,941,207 | 7/1990 | Maeda et al. | 455/617 |
| 4,991,925 | 2/1991 | Mitchell et al. | 350/96.15 |

FOREIGN PATENT DOCUMENTS

| | | |
|---|---|---|
| 2152679 | 4/1973 | France. |
| 55-143854 | 7/1980 | Japan. |
| 8700996 | 9/1912 | PCT Int'l Appl.. |

OTHER PUBLICATIONS

Denshi Tsushin Gakkai-shi (Japanese Transliteration) Nov. 1985, vol. 68, No. 11, pp. 1195–1200.

*Primary Examiner*—Edward L. Coles, Sr.
*Assistant Examiner*—Kinfe-Michael Negash
*Attorney, Agent, or Firm*—Oblon, Spivak, McClelland, Maier & Neustadt

[57] ABSTRACT

A private branch radio communication system includes a portable radio transmitter and a portable radio receiver. The system further includes first and second repeaters respectively located in first and second areas within a given premises and coupled to each other through an optical fiber cable. A radio signal output from the portable radio transmitter is converted into an optical signal by the first repeater, and is then supplied to the second repeater through the optical fiber cable, and converted into a radio signal which is received by the portable radio receiver.

11 Claims, 6 Drawing Sheets

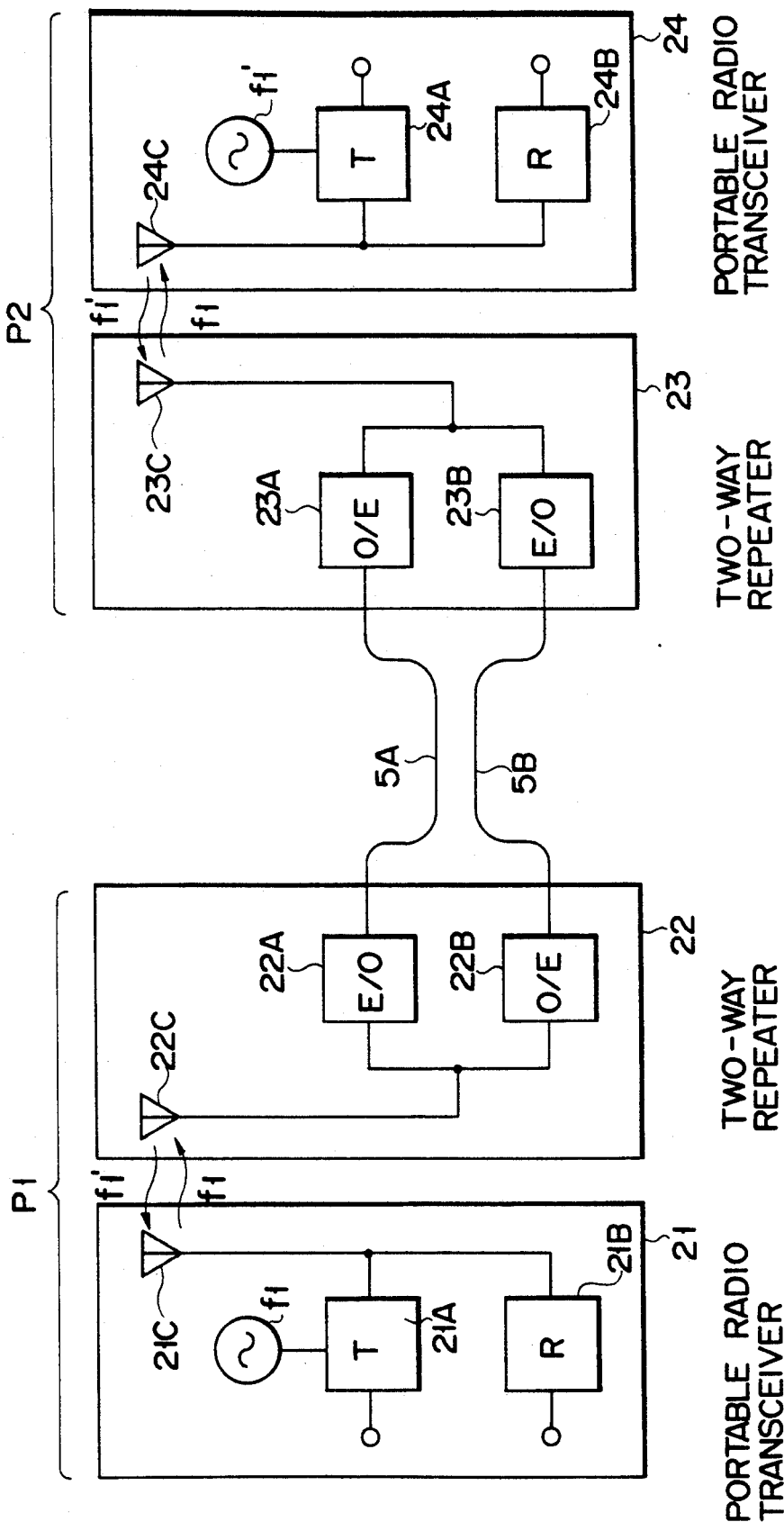
F I G. 2

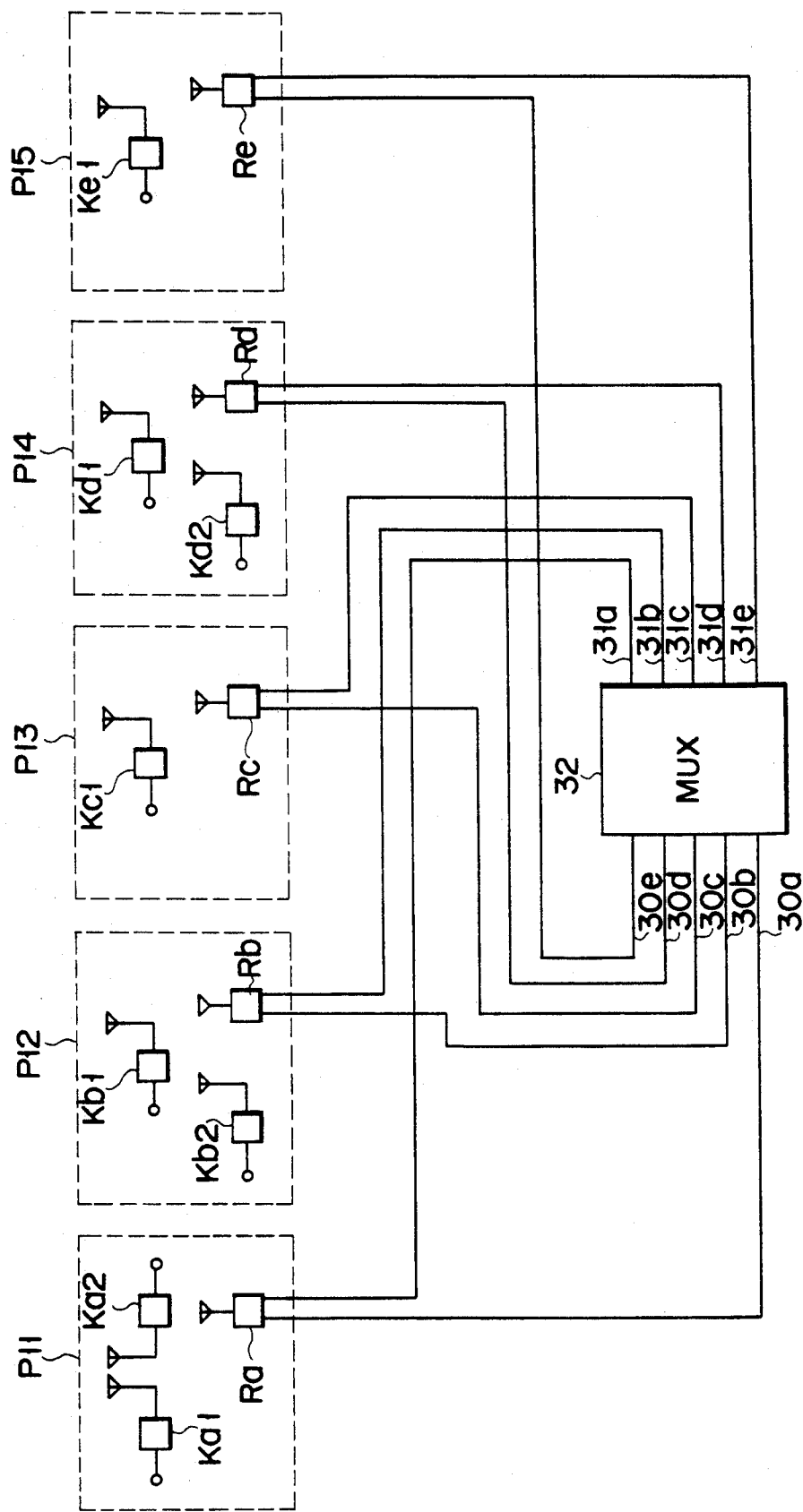
F I G. 3

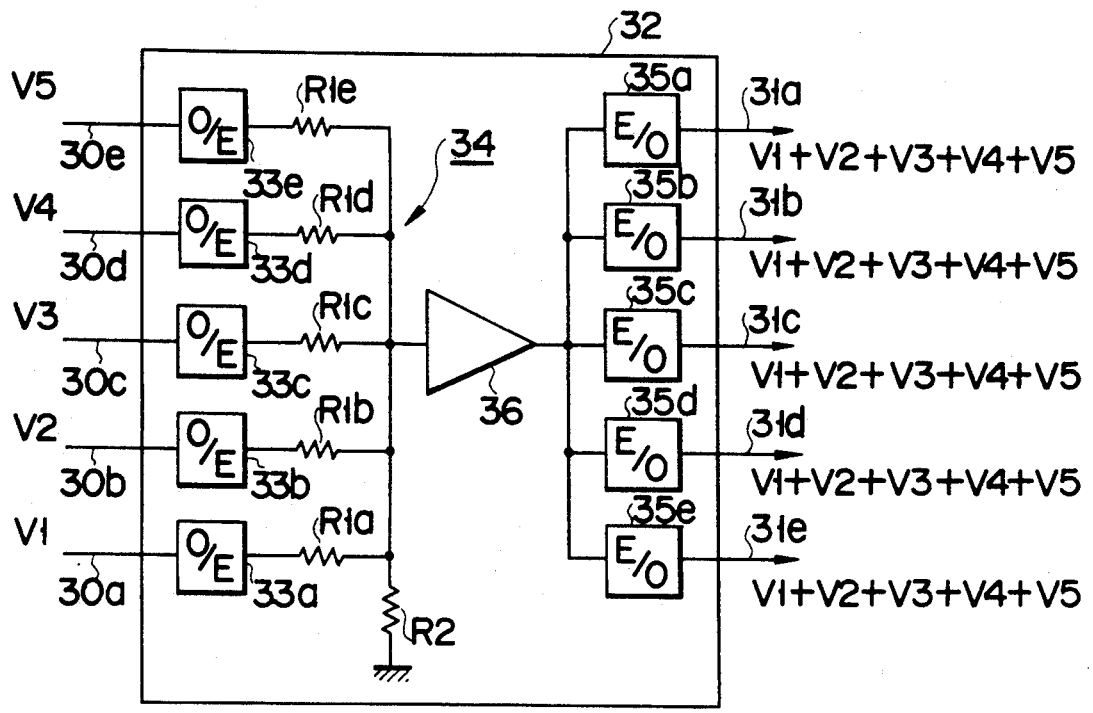
F I G. 4
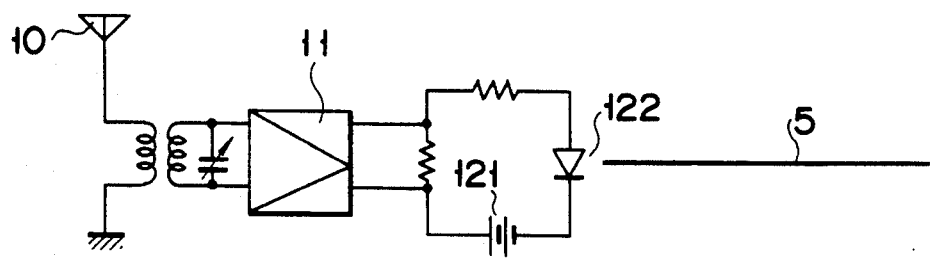
F I G. 5
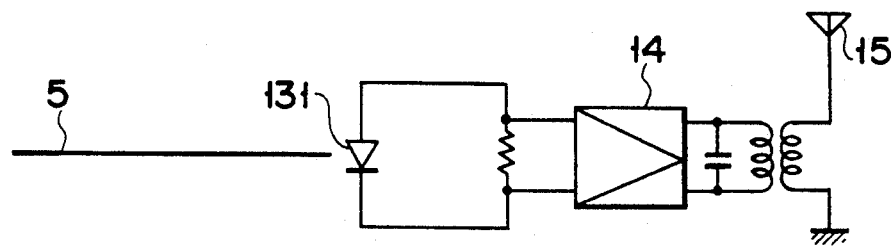
F I G. 6

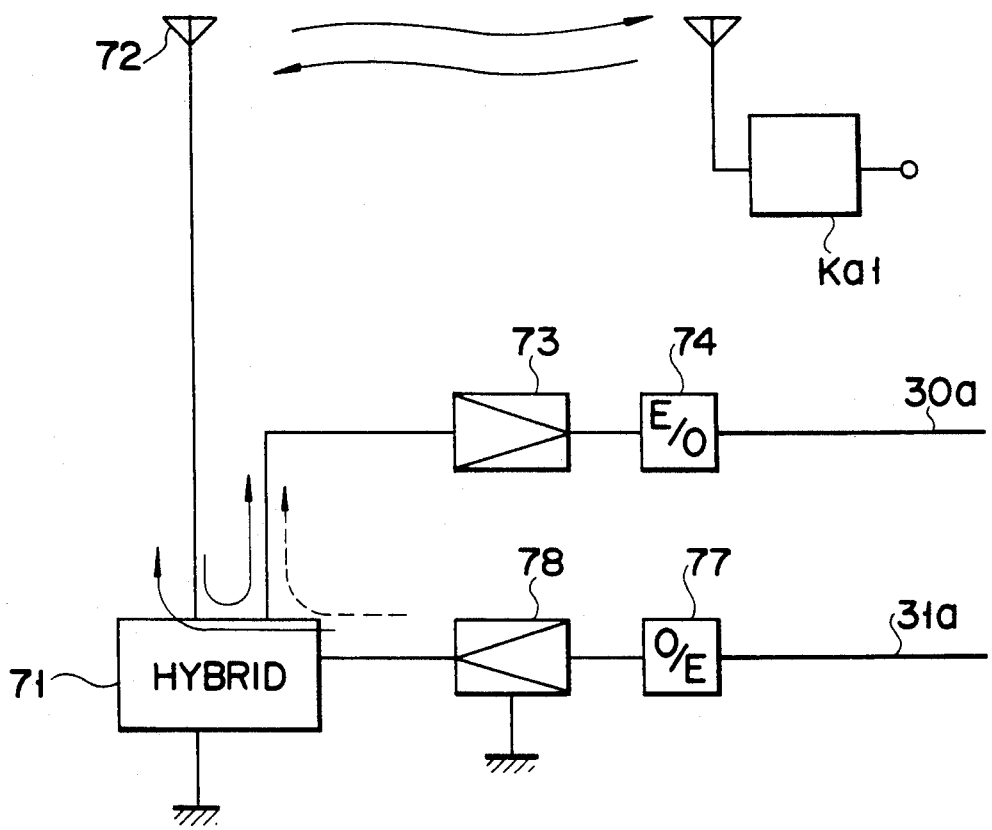
F I G. 7

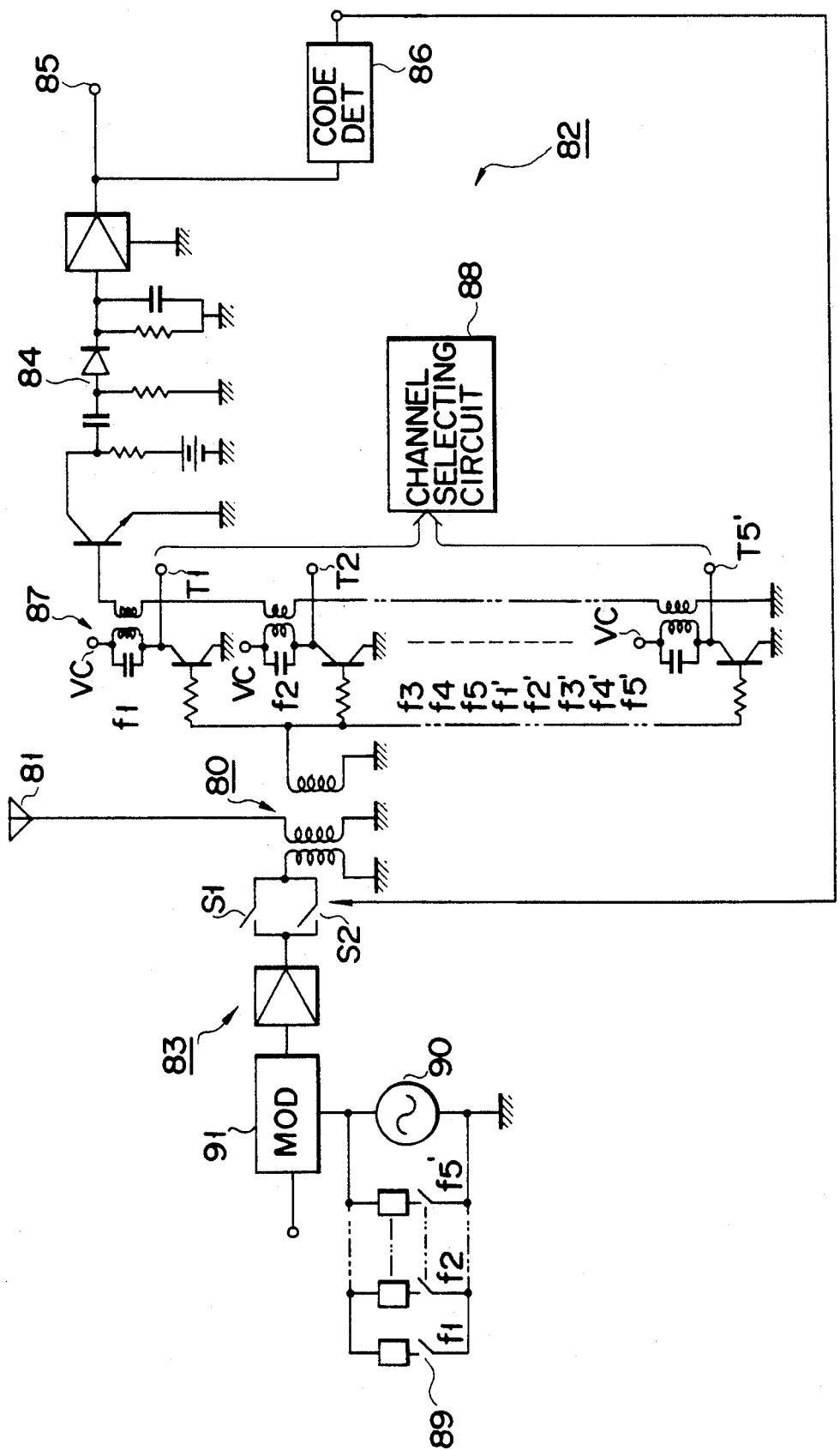
F I G. 8

PRIVATE BRANCH RADIO COMMUNICATION SYSTEM USING OPTICAL FIBERS

This application is a continuation of application Ser. No. 07/367,315, filed on Jun. 16, 1989, now abandoned.

BACKGROUND OF THE INVENTION

1. Field of the Invention

The present invention relates to a private branch radio communication system and, more particularly, to a private branch radio communication system using optical fibers.

2. Description of the Related Art

On sites such as power plants or substations, large numbers of personnel may be engaged in jobs related to each other, but often doing so in widely separated locations throughout the site. For this reason, a radio communication system is generally used to enable personnel to communicate with each other, with each worker carrying a portable radio transceiver while doing his job, and exchanging information with other personnel, as and when required.

This type of radio communication system utilizes a relatively weak radio wave, this being because if a strong radio wave were to be used, it might interfere with the operation of various electronic devices located on the same premises.

If radio communication is to be performed in a building, especially in a so-called intelligent building in which various systems, such as the air conditioning system, for example, are computer-controlled, a very weak radio wave, e.g., a radio wave having a field intensity of 500 $\mu$V/m or less which is measured at, for example, a position 3 m away from a radio wave source, should preferably be used in order to prevent erroneous operation of various electronic devices in the building, as a result of radio interference. However, in buildings, the transmitting of radio waves tends to be hindered by walls, pillars, and the like. Therefore, when a weak radio wave is, for the aforestated reasons, used for communication within a building, satisfactory communication from the ground floor to the uppermost floor cannot be achieved. For this reason, radio communication using a weak radio wave can be employed only for private branch communication within a confined area, e.g., within one floor of a building, but not throughout all floors of the building. As a result, the range through which personnel can move and remain in communication is undesirably limited.

SUMMARY OF THE INVENTION

Accordingly, it is an object of the present invention to provide a private branch radio communication system using a weak radio wave but capable of providing excellent radio communication over a wide area, such as throughout a given premises or site.

According to the present invention, there is provided a private branch radio communication system comprising a portable radio transmitter for modulating a signal and outputting the modulated signal as a radio signal in a first area within a given premises, a first repeater, located in the first area, for receiving the radio signal transmitted from the radio transmitter and outputting an optical signal corresponding to the signal received; an optical transmission medium for transmitting the optical signal output from the first repeater to a second area within the premises, a second repeater, located in the second area, for receiving the optical signal output from the first repeater and transmitted by the optical transmission medium, and generating a radio signal corresponding to the signal received in the second area, and a portable radio receiver for receiving the radio signal output from the second repeater in the second area and demodulating the signal received.

In the above-described private branch radio communication system, the first and second repeaters are, as described above, located in the first and second areas, respectively, and are coupled to each other through an optical fiber cable. As a result, a radio signal generated from the portable radio transmitter is not transmitted directly from the first area to the second area by radio transmission, but is first converted into an optical signal by the first repeater in the first area, the optical signal is then transmitted through the optical fiber cable to the second repeater in the second area, and is converted by the second repeater back into a radio signal which is received by the portable radio receiver.

As described above, since communication between the first and second areas is accomplished not by direct radio transmission but by means of an optical fiber cable, therefore even if the first and second areas are, for example, different floors in a building, or even different buildings, communication between the first and second areas is free from interference caused by obstacles to transmission, such as walls and pillars in the building or, in the latter case, other buildings in-between. Therefore, even when using a weak radio wave generated by a portable transmitter, the present invention is able to provide excellent private branch radio communication over a wide-ranging area.

In addition, since an optical signal transmitted through an optical fiber cable is not an electrical signal, such a signal is therefore free from electrical influences caused by various other electrical signal lines and it, in turn, does not adversely influence such signal lines.

Thus, the private branch radio communication system of the present invention, using a weak radio wave and an optical signal, provides excellent private branch radio communication while at the same time having minimal adverse influence on various other electrical devices and telephone lines.

BRIEF DESCRIPTION OF THE DRAWINGS

FIG. 2 is a block diagram showing a private branch radio communication system according to a second embodiment of the present invention;

FIG. 3 is a block diagram showing a private branch radio communication system according to a third embodiment of the present invention;

FIG. 4 is a circuit diagram showing an embodiment of an arrangement of an optical multiplexer used in the private branch radio communication system in FIG. 3;

FIG. 5 is a circuit diagram showing an embodiment of an arrangement of a first repeater used in the private branch radio communication system in FIG. 1;

FIG. 6 is a circuit diagram showing an embodiment of an arrangement of a second repeater used in the private branch radio communication system in FIG. 1;

FIG. 7 is a circuit diagram showing an embodiment of an arrangement of a repeater used in the private branch radio communication system in FIG. 3; and FIG. 8 is a circuit diagram showing an arrangement of a portable radio transceiver used in the private branch radio communication system in FIG. 3.

DETAILED DESCRIPTION OF THE PREFERRED EMBODIMENTS

Figure 1:
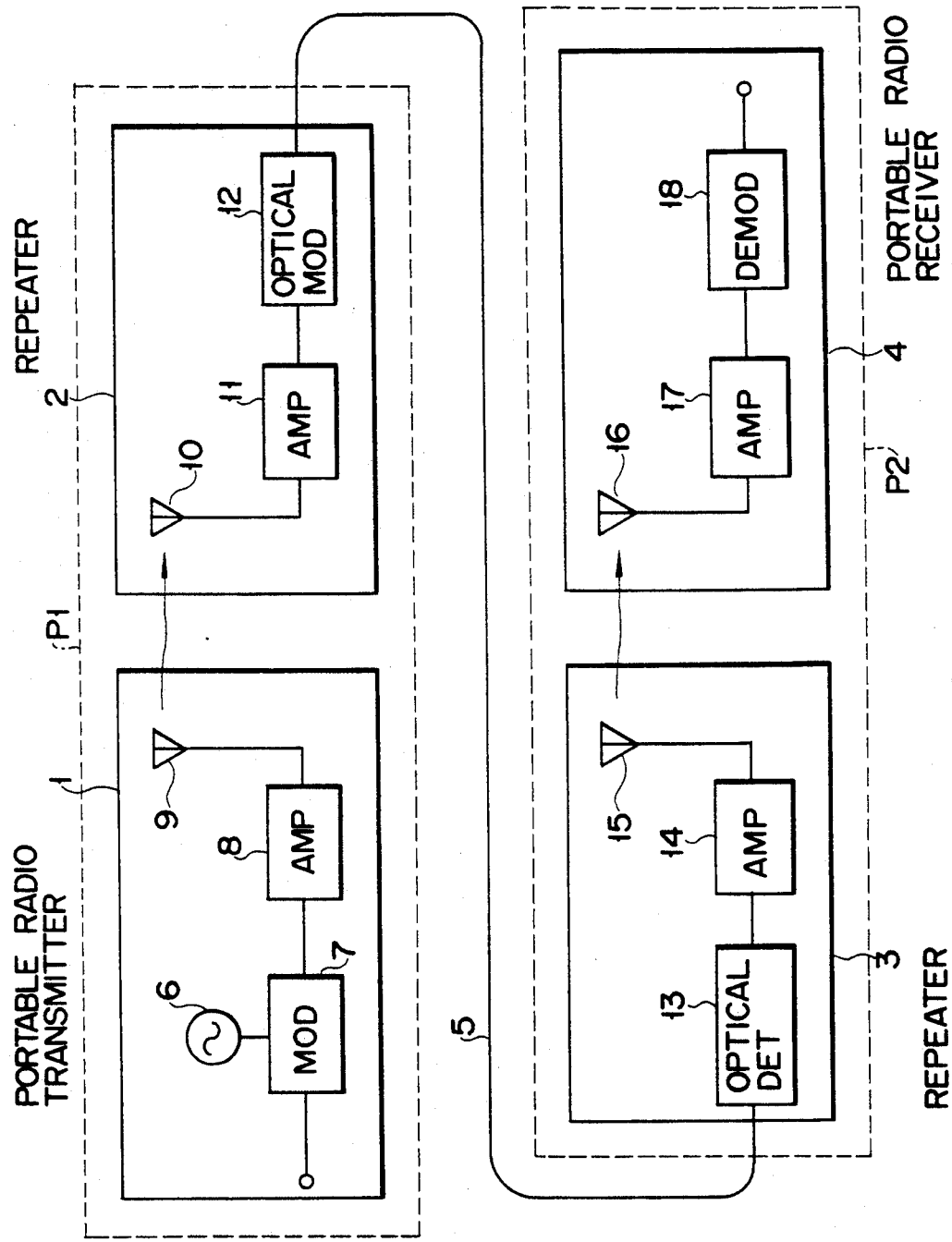
FIG. 1 is a block diagram showing a private branch radio communication system according to a first embodiment of the present invention.

FIG. 1 shows a private branch radio communication system according to a first embodiment of the present invention. Referring to FIG. 1, a first area P1 represents a specific place in a specific building or site, e.g., a specific floor in a building, and a second area P2 represents a place separated from the first area P1 by a relatively large distance, e.g., another floor in the same building as that of the first area P1, or another place within the same site as that of the first area P1.

This private branch communication system is designed to transmit a radio signal generated by a portable radio transmitter 1 used in the first area P1 to a portable radio receiver 4 used in the second area P2. In this system, the portable radio transmitter 1 and a repeater 2 are arranged in the first area P1. The radio transmitter 1 is carried by, e.g., a worker and is freely moved in the first area P1. The repeater 2 is fixed in a specific place of the first area P1. Similarly, the portable radio receiver 4 and a repeater 3 are arranged in the second area P2. The radio receiver 4 can be freely moved in the second area P2, and the repeater 3 is fixed in a specific place of the second area P2. The repeaters 2 and 3 are coupled to each other through an optical fiber cable 5.

The portable radio transmitter 1 comprises a modulator 7 including an oscillator 6, an amplifier 8, and a transmitting antenna 9. The radio transmitter 1 modulates a carry signal by a modulation signal to be transmitted, e.g., a speech signal by using the modulator 7, and amplifying the modulated signal by using the amplifier 8, thus radiating the amplified signal in air as a radio signal through the antenna 9. The repeater 2 comprises a receiving antenna 10, an amplifier 11, and an optical modulator 12. The repeater 2 receives a radio signal output from the radio transmitter 1 through the antenna 10, amplifies the received signal by using the amplifier 11, and converts the signal into an optical signal by using the optical modulator 12, thus supplying the signal to the optical fiber cable 5.

The repeater 3 comprises an optical detector 13, an amplifier 14, and a transmitting antenna 15. The repeater 3 converts the optical signal, which is transmitted from the repeater 2 through the optical fiber cable 5, into an electrical signal by using the optical detector 13, and amplifies the electrical signal by using the amplifier 14, thereby radiating the amplified signal in air as a radio signal through the antenna 15. The portable radio receiver 4 comprises a receiving antenna 16, an amplifier 17, and a demodulator 18. The radio receiver 4 receives a radio signal output from the repeater 2 through the antenna 16, and amplifies the received signal by using the amplifier 17, thereby demodulating the signal by using the demodulator 18. As a result, the modulation signal (speech signal in this case) is extracted from the received signal.

Since both the radio transmitter 1 and the repeater 2 are present in the first area P1, communication therebetween can be satisfactorily performed by using a weak radio wave (e.g., a radio wave having a field intensity of 500 $\mu$V/m or less which is measured at a position separated from the radio transmitter 1 by 3 m). Similarly, since both the radio receiver 4 and the repeater 3 are present in the second area P2, communication therebetween can be satisfactorily performed by using a weak radio wave (e.g., a radio wave having a field intensity of 500 $\mu$V/m or less which is measured at a position separated from the repeater 3 by 3 m).

Since signal transmission over a relatively large distance from the first area P1 to the second area P2 is performed not by radio transmission but by means of the optical fiber cable 5, a signal from the first area P1 is transmitted to the second area P2 without loss caused by radio wave obstacles such as walls and pillars in a building, or buildings in a site. Therefore, even if a radio wave output from the radio transmitter 1 is weak, a radio signal can satisfactorily be transmitted to the radio receiver 4 in an excellent state.

In addition, since an optical signal transmitted through the optical fiber cable 5 is not an electrical signal, the signal is free from electrical influences from various other electrical signal lines and does not influence them.

A signal to be transmitted by this private branch radio communication system is not limited to a speech signal, but may include image signals or various data signals. In addition, it may include analog or digital signals.

FIG. 5 shows a detailed arrangement of the repeater 2. As shown in FIG. 5, a circuit including a constant-voltage source 121 and a laser diode 122 is used as the optical modulator of the repeater 2. In this circuit, a light-emitting diode may be used in place of the laser diode 122.

FIG. 6 shows a detailed arrangement of the repeater 3. As shown in FIG. 6, a circuit including a photodiode 131 is used as the optical detector 13 of the repeater 13.

Since the repeaters 2 and 3 respectively perform only electrical/optical conversion and optical/electrical conversion, they can be realized by simple circuit arrangements respectively shown in FIG. 5 and FIG. 6.

FIG. 2 shows a private branch communication system according to a second embodiment of the present invention. This system is designed to realize duplex simultaneous communication between first and second areas P1 and P2. Referring to FIG. 2, a portable radio transceiver 21 and two-way repeater 22 are arranged in the first area P1. The radio transceiver 21 is carried by, e.g., a worker and is moved within the first area P1. The repeater 22 is fixed in a specific place of the first area P1. Similarly, a portable radio transceiver 24 and a two-way repeater 23 are arranged in the second area P2. The transceiver 24 is moved within the second area P2, and the repeater 23 is fixed in a specific place of the second area P2. The repeaters 22 and 23 are coupled to each other through optical fiber cables 5A and 5B.

The portable radio transceiver 21 includes a transmitting section 21A, a receiving section 21B, and a transmitting/receiving antenna 21C. The transmitting and receiving sections 21A and 21B respectively correspond to the transmitter 1 and the receiver shown in FIG. 1. The radio transceiver 21 modulates and amplifies a signal to be transmitted, e.g., a speech signal by using the transmitting section 21A, and radiates the resultant signal in air as a radio signal having a carrier frequency f1 through the antenna 21C. In addition, the radio transceiver 21 receives a radio signal having a carrier frequency f1' through the antenna 21C, and amplifies and demodulates the received signal by using the receiving section 21B. As a result, the modulation signal (speech signal in this case) is extracted from the received signal.

The two-way repeater 22 comprises a transmitting-/receiving antenna 22C, an electrical/optical signal converting section 22A, and an optical/electrical signal converting section 22B. The electrical/optical converting section 22A and the optical/electrical modulator 22B respectively correspond to the repeaters 2 and 3 shown in FIG. 1. The repeater 22 receives a radio signal output from the transceiver 21 through the antenna 22C, and converts the received signal into an optical signal by using the electrical/optical converting section 22A, thereby supplying the signal to the optical fiber cable 5A. In addition, the repeater 22 converts an optical signal supplied through the optical fiber cable 5B into an electrical signal by using the optical/electrical converting section 22B, and radiates the converted signal in air as a radio signal having the carrier frequency f1' through the antenna 22C.

The two-way repeater 23 comprises a transmitting-/receiving antenna 23C, an optical/electrical converting section 23A and an electrical/optical signal converting section 23B. The electrical/optical signal converting section 23B and the optical/electrical modulator 23A respectively correspond to the repeaters 2 and 3 shown in FIG. 1. The repeater 23 converts an optical signal supplied through the optical fiber cable 5A into an electrical signal by using the optical/electrical signal converting section 23A, and radiates the converted signal in air as a radio signal having the carrier frequency f1 through the antenna 23C. In addition, the repeater 23 receives a radio signal having the frequency f1' output from the transceiver 24 through the antenna 23C, and converts the received signal into an optical signal by using the electrical/optical converting section 23B, thereby supplying the signal to the optical fiber cable 5B.

The portable radio transceiver 24 comprises a transmitting/receiving antenna 24C, a transmitting section 24A, and a receiving section 24B. The transmitting and receiving sections 24A and 24B respectively correspond to the transmitter 1 and the receiver 4 shown in FIG. 1. The radio transceiver 24 modulates and amplifies a signal to be transmitted, e.g., a speech signal by using the transmitting section 24A, and radiates the resultant signal in air as a radio signal having the carrier frequency f1' through the antenna 24C. In addition, the transceiver 24 receives a radio signal having the carrier frequency f1 through the antenna 24C, and amplifies and demodulates the received signal by using the receiving section 24B. As a result, the modulation signal (speech signal in this case) is extracted from the received signal.

Since the private branch radio communication system of the second embodiment employs different carrier frequencies for transmission and reception, duplex communication can be realized. In addition, since the two-way repeaters 22 and 23 are respectively distributed in the first and second areas P1 and P2, communication between the portable transceivers 21 and 24 can be performed by using a weak radio wave as in the first embodiment.

In this embodiment, the two optical fiber cables 5A and 5B are used for signal transmission between the repeaters 22 and 23. However, by properly utilizing optical components, signal transmission between the repeaters can be realized by a single optical fiber cable. Also, with the arrangement of the second embodiment, one-way alternate communication can be realized.

FIG. 3 shows a private branch radio communication system according to a third embodiment of the present invention. This system is designed to realize duplex communication not only between the two areas P1 and P2 as described in the first and second embodiments but also between arbitrary areas of a plurality of areas. In this system, the premises are divided into five areas P11 to P15. A two-way repeater and one portable radio transceiver or more are arranged in each area. More specifically, a two-way repeater Ra and two portable radio transceivers Ka1 and Ka2 are arranged in the area P11, a two-way repeater Rb and two portable radio transceivers Kb1 and Kb2 are arranged in the area P12, a two-way repeater Rc and a portable radio transceiver Kc1 are arranged in the areas P13, a two-way repeater Rd and two portable radio transceivers Kd1 and Kd2 are arranged in the area P14, and a two-way repeater Re and two portable radio transceivers Ke1 and Ke2 are arranged in the area P15. A each range of these areas P11 to P15 is setting so that a weak radio wave can sufficiently propagate in the each area.

The repeater Ra is coupled to transmitting and receiving optical fiber cables 30a and 30b. Similarly, the repeaters Rb, Rc, Rd, and Re ar respectively coupled to transmitting and receiving optical fiber cables 30b and 31b, 30c and 31c, 30d and 31d, and 30e and 31e.

An optical multiplexer 32 includes input ports coupled to the optical fiber cables 30a to 30e, and output ports coupled to the optical fiber cables 31a to 31e. The multiplexer 32 multiplexes all the optical signal supplied through the cables 30a to 30e, and outputs a multiplexed signal to the optical fiber cables 31a to 31e, respectively.

An operation of the above-described system will be described below. Assume that ten frequencies f1 to f5 and f1' to f5' are respectively assigned to the transceivers Ka1 to Ke1. In this system, if a specific portable radio transceiver transmits a radio signal having the frequency f1, another portable radio transceiver which receives the signal sends back a radio signal having the frequency f1' as a response signal. Therefore, in this system, five channels allowing simultaneous communication are ensured, i.e., a first channel using the frequencies f1 and f1', a second channel using the frequencies f2 and f2', a third channel using the frequencies f3 and f3', a fourth channel using the frequencies f4 and f4', and a fifth channel using the frequencies f5 and f5'.

Each of the radio transceivers Ka1 to Ke1 can radiate a radio signal having any one of the frequencies f1 to f5 and f1' to f5', and can receive a radio signal having any of the frequencies f1 to f5 and f1' to f5'. In addition, each of the units Ka1 to Ke1 has a function of detecting a frequency used by another unit. With this function, each of the units Ka1 to Ke1 can output a radio signal by using an unused frequency, i.e., a free channel, thus preventing radio interference.

Speech communication using the system shown in FIG. 3 will be described below in a state wherein all of the above-described first to fifth channels are used.

Radio signals generated by this system are ten signals denoted by V1 to V5 and V1' to V5' respectively corresponding to the carrier frequencies f1 to f5 and f1' to f5'. If these radio signals V1 to V5 and V1' to V5' are signals having amplitude-modified waves, the radio signals V1 to V5 and V1' to V5' can be represented as follows:

$$V1 = A(1 + si(t)\sin(2\pi f1 t))$$

$$V2 = A(1 + sj(t)\sin(2\pi f2 t))$$

$$V3 = A(1 + sk(t)\sin(2\pi f3 t))$$

$$V4 = A(1 + sp(t)\sin(2\pi f4 t))$$

$$V5 = A(1 + sq(t)\sin(2\pi f5 t))$$

$$V1' = A(1 + si'(t)\sin(2\pi f1't))$$

$$V2' = A(1 + sj'(t)\sin(2\pi f2't))$$

$$V3' = A(1 + sk'(t)\sin(2\pi f3't))$$

$$V4' = A(1 + sp'(t)\sin(2\pi f4't))$$

$$V5' = A(1 + sq'(t)\sin(2\pi f5't))$$

where A is a constant and si(t), sj(t), sk(t), sp(t), sq(t), si'(t), sj'(t), sk'(t), sp'(t), and sq'(t) are modulation signals such as speech signals. For example, with respect to the radio signal V1 for speech communication which is transmitted from a given transceiver, the radio signal V1' is sent back from another transceiver as a response signal. Similarly, with respect to the radio signals V2, V3, V4, and V5, the radio signals V2', V3', V4' and V5' are respectively sent back as response signals.

When the radio signals V1 to V5 are respectively generated in the areas P11 to P15, these signals are respectively converted into optical signals by the repeaters Ra to Re so as to be transmitted to the optical fiber cables 30a to 30e. The signals V1 to V5 are multiplexed by the optical multiplexer 32, and the multiplexed signal V1+V2+V3+V4+V5 is supplied to the optical fiber cables 31a to 31e. As a result, the multiplexed signals V1+V2+V3+V4+V5 are received by the repeaters Ra to Re. Thereafter, the multiplexed signals V1+V2+V3+V4+V5 are generated as radio signals in the areas P11 to P15.

In this manner, a signal transmitted from each portable radio transceiver is commonly supplied to the respective areas P11 to P15. Since the transceivers Ka1 to Ke1 can receive radio signals of all the frequencies, a transceiver as a source, i.e., a source operator must specify a transceiver as a destination, i.e., a designation operator. If the source operator transmits a signal for specifying a designation operator, e.g., a specific call code like a telephone number prior to transmission of a radio signal for speech communication in the same manner as in a known normal paging system, this problem can be solved. More specifically, the source operator superposes a call signal for specifying a designation operator on the frequency of a free channel (one of the frequencies f1, f2, f3, f4, and f5) and transmits it. Since the call signal is distributed to all the areas P11 to P15, a destination operator in any area can receiver the call signal.

When a specific portable radio transceiver calls another specific portable radio transceiver in this manner, the called transceiver sends back a response signal. In this case, if the call signal has the carrier frequency f1, the called radio transceiver sends back the response signal V1' having the carrier frequency f1'. Similarly, the response signal V2' having the carrier frequency f2' is sent back with respect to a call signal having carrier frequency f2.

Similar to the above-described transmission signals V1 to V5, the response signals V1' to V5' thus generated are supplied to the optical multiplexer 32 through the optical fiber cables 30a to 30e and are multiplexed by the multiplexer 32. The multiplexed signal V1'+V2'+V3'+V4'+V5' is commonly supplied to all the areas P11 to P12.

As described above, in the system of the third embodiment, since transmission signals from the respective areas are multiplexed by the optical multiplexer 32, and the multiplexed signal is supplied to all the areas, duplex communication can be performed between arbitrary areas.

FIG. 4 shows a detailed arrangement of the optical multiplexer 32. The multiplexer 32 comprises optical/electrical signal converters 33a to 33e, an adder 34 including resistors R1a to R1e and R2, an amplifier 36, and electrical/optical signal converters 35a to 35e. In the optical multiplexer 32 having the above arrangement, the signals V1 to V5 input as optical signals are respectively converted into electrical signals by the converters 33a to 33e, and are added to each other by the adder 34. The adder signal V1+V2+V3+V4+V5 is amplified by the amplifier 36. The amplified signal is then supplied to converters 35a to 35e, and hence the signals V1+V2+V3+V4+V5 are supplied to the optical fiber cables 31a to 31e as optical signals, respectively.

FIG. 7 shows a detailed arrangement of each of the repeaters Ra to Re used in the system of the third embodiment shown in FIG. 3. Since the repeaters Ra to Re have the same arrangement, FIG. 7 shows an arrangement corresponding to the repeater Ra. Referring to FIG. 7, a transmitting/receiving antenna 72, a receiving section including an amplifier 73 and an electrical/optical signal converter 74, and a transmitting section including an amplifier 78 and an optical/electrical signal converter 77 are coupled to a hybrid circuit 71. An optical fiber cable 30a is coupled to the electrical/optical signal converter 74. An optical fiber cable 31a is coupled to the optical/electrical signal converter 77. The amplifiers 73 and 78 are respectively designed to cover all the frequency bands used in this system. The hybrid circuit 71 is designed to cause a signal to flow in a direction indicated by a solid arrow and not to flow in a direction indicated by a broken arrow.

FIG. 8 shows a detailed arrangement of each of the portable radio transceivers Ka1 to Ke1 used in the system of the third embodiment shown in FIG. 3. Each transceiver includes a hybrid circuit 80, a transmitting/receiving antenna 81, a receiving section 82, and a transmitting section 83.

The receiving section 82 includes a tuner 87, a detector 84, a call code detector 86, and a channel selecting circuit 88. The tuner 87 is constituted by 10 resonators respectively corresponding to the carrier frequencies f1 to f5 and f1' to f5', as shown in FIG. 8. The tuner 87 selectively outputs a channel selection signal from one of terminals T1 to T5' in accordance with a received carrier frequency. For example, when a radio signal having the carrier frequency f1 is received, a channel selection signal is output from the terminal T1 and is supplied to the channel selecting circuit 88. Upon reception of the channel selection signal from the terminal T1, the circuit 88 turns on a lamp (not shown) for indicating that the frequency f1 is used, and at the same time, controls the tuner 87 not to receive signals other than the frequency f1 until the contents of a call code are checked by the call code detector 86. Similarly, when a channel selection signal is supplied form the terminal T2, the circuit 88 turns on a lamp (not shown) indicating that the frequency f2 is used, and at the same time, controls the tuner 87 not to receive signals other than the frequency f2 until the contents of a call code are checked by the call code detector 86. Such a control operation for channel selection by the channel selecting circuit 88 can be realized by various methods, i.e., a method of selectively interrupting supply of a power source voltage VC to each portion of a resonator.

The detector 84 is used to extract a modulation signal such as a speech signal from a signal received by the tuner 87. The extracted modulation signal is output to a terminal 85, and at the same time, is supplied to the call code detector 86. The call code detector 86 has a pre-assigned self code and compares it with a call code supplied from another radio transceiver. If they coincide with each other, the detector 86 generates a signal for turning on a switch S2 of the transmitting section 83.

The transmitting section 83 includes an oscillator 90, a transmission frequency switching circuit 89, a modulator 91, and switches S1 and S2. The circuit 89 is used to manually select carrier frequencies for transmission. For example, when the lamp for indicating that the carrier frequency f1 is used is turned on by the channel selecting circuit 88, the frequency f1 will not be used (since the frequency f1' is also used, the frequency f1' will not be used) and an unused frequency is selected. The modulator 91 modulates a carrier wave having a frequency selected by the circuit 89 by using a modulation signal such as a speech signal. The modulated signal is then radiated in air from the transmitting/receiving antenna 81 when one of the switches S1 and S2 is ON. The switch S1 is manually operated and is set in an ON state when signal transmission is to be performed. The switch F2 is controlled by an output signal from the call code detector 86 and is automatically set in an ON state when a call code is transmitted from another radio transceiver to its own channel.

As has been described above, according to the private branch radio communication system of the present invention, by combining a transmission medium using radio waves with a transmission medium using optical fibers, excellent communication can be provided in a wide range covering the entire premises even when a weak radio wave is used.

What is claimed is;

1. A low power private branch radio communication system for realizing communication between a plurality of portable radio transmitters and a plurality of portable radio receivers, said system comprising:
    a first portable radio transmitter, located in a first area within a given premises, for selecting an unused first radio carrier frequency from among a plurality of radio carrier frequencies, modulating said first radio carrier frequency with a signal to produce a modulated first radio carrier signal, outputting the modulated first radio carrier signal as a radio signal of limited power in the first area;
    a first repeater means, located in the first area, for receiving the modulated first radio carrier signal transmitted from said radio transmitter and for outputting a modulated optical signal corresponding to the modulated first radio carrier signal received, said first repeater means including a first antenna for receiving said modulated first radio carrier signal, and a light-emitting diode for converting said modulated first radio carrier signal received into an optical signal modulated by said modulated first radio carrier signal;
    an optical transmission medium for transmitting the modulated optical signal output from said first repeater means to a second area within said premises;
    a second repeater means, located in the second area, for receiving the modulated optical signal output from said first repeater means and transmitted by said optical transmission medium, and for generating a modulated second radio carrier signal of limited power having a frequency equal to that of said first radio carrier signal and corresponding to the modulated optical signal received in the second area, said second repeater means including a photo diode for converting said modulated optical signal into said modulated second radio carrier signal; and
    a second portable radio receiver, located in the second area, for receiving a modulated radio carrier signal transmitted thereto, from among a plurality of modulated radio carrier signals having different frequencies and generated in the second area,
    wherein output powers of all the radio carrier signals of the system are limited to below a power level above which malfunction of electronic equipment in the vicinity of the radio transmission is likely to occur; and
    wherein the first area is an area determined in accordance with said output powers, so that the first repeater means can receive signals generated by the first portable radio transmitted, the second area is an area determined in accordance with said output powers, so that the second portable radio receiver can receive radio signals from the second repeater means, and the first and second areas are arranged in one open space and are unshielded.

2. A lower power private branch radio communication system for realizing simultaneous two-way communication between a plurality of portable transceivers, said system comprising:
    a first portable radio transceiver, used in a first area within a given premises, for selecting an unused first radio carrier signal from among a plurality of radio carrier signals having different frequencies, modulating the selected first radio carrier signal, and generating the modulated first radio carrier signal as a low power radio signal in the first area, and for receiving a modulated radio carrier signal transmitted thereto, from among a plurality of low power modulated radio carrier signals generated in the first area and having different frequencies, and demodulating the radio carrier signal received;
    a second portable transceiver, used in a second area within said premises, for selecting an unused second radio carrier signal from among a plurality of radio carrier signals having different frequencies, modulating the selected second radio carrier signal, and generating the modulated second radio carrier signal as a low power radio signal in the second area within said premises, and for receiving a modulated radio carrier signal transmitted thereto, from among a plurality of radio carrier signals generated in the second area and having output powers of different frequencies, and demodulating the modulated radio carrier signal received;
    a pair of fist and second optical transmission media, arranged within said premises, each for coupling the first and second areas to each other;
    a first two-way repeater means, arranged in the first area within the premises, for receiving the modulated first radio carrier signal output from said first portable radio transceiver and supplying a modulated optical signal corresponding to the modulated first radio carrier signal received to said first optical transmission medium, and for receiving a modulated optical signal transmitted through said second optical transmission medium and generating a low power modulated radio carrier signal corresponding to the modulated optical signal received in the first area; and a second two-way repeater means, arranged in the second area within the premises, for receiving the modulated optical signal output from said first repeater means and transmitted through said first optical transmission medium, and generating a low power modulated radio carrier signal corresponding to the modulated optical signal received in the second area, and for receiving the low power modulated second radio carrier signal output from said second portable radio transceiver and supplying a modulated optical signal corresponding to the modulated second radio carrier signal received to said optical transmission medium, wherein output power of all the radio carrier signals generated by the system are limited to be below a power above which malfunction of electronic equipment in the vicinity of the radio transmission is likely to occur; and wherein the first and second areas are areas determined in accordance with said output power, so that the first and second transceivers can transceive signals with the first and second two-way repeater means, respectively, and the first and second areas are arranged in one open space and are unshielded.

3. A system according to claim 2, wherein said first two-way repeater means includes a transmitting/receiving antenna, electrical/optical signal converting means for converting a radio signal received by said transmitting/receiving antenna into an optical signal, and optical/electrical signal converging means for converting, into an electrical signal, an optical signal transmitted through said optical transmission medium and supplying the electrical signal to said transmitting/receiving antenna.

4. A system according to claim 2, wherein said second two-way repeater means includes a transmitting/receiving antenna, electrical/optical signal converting means for converting a radio signal received by said transmitting/receiving antenna into an optical signal, and optical/electrical signal converting means for converting, into an electrical signal, an optical signal transmitted through said optical transmission medium and supplying the electrical signal to said transmitting/receiving antenna.

5. A private branch radio communicating system comprising:
   a plurality of portable radio transceivers;
   a plurality of first optical transmission media;
   a plurality of second optical transmission media;
   a plurality of two-way repeater means, each two-way repeater means being connected to one of the plurality of first optical transmission means and one of the plurality of second optical transmission media, and being distributed throughout a plurality of areas within a given premises, for receiving radio signals generated in the respective areas where the repeater means are distributed and for supplying optical signals corresponding to the signals received to the respective ones of the plurality of first optical transmission media, and for receiving optical signals inputted through the respective ones of the plurality of second optical transmission media and for generating radio signals, corresponding to the signals received, in the respective areas; and optical signal multiplexing means including optical to electrical signal converting means for converting, into electrical signals, optical signals transmitted through said plurality of first optical transmission media, adding means for adding said electrical signals converted by said optical to electrical converting means, electrical to optical converting means for converting said added electrical signal into an optical signal, and supplying means for supplying the optical signal converted by said electrical to optical converting means to each of said plurality of second optical transmission media.

6. A system according to claim 5, wherein said each of portable radio transceivers outputs a radio signal having a field intensity which allows the signal to be received in any part of one of said areas.

7. A system according to claim 5, wherein the radio signal outputted by each of said two-way repeater means has a field intensity allowing the signal to be received in any part of the corresponding area in which the two-way repeater means is located.

8. A system accordingly to claim 5, wherein said each of two-way repeater means includes a transmitting and receiving antenna, electrical to optical signal converting means for converting a radio signal received by said transmitting and receiving antenna into an optical signal, and optical to electrical signal converting means for converting, into an electrical signal, an optical signal transmitted through said second optical transmission medium and for supplying the electrical signal to said transmitting and receiving antenna.

9. A system according to claim 5, wherein said optical signal multiplexing means includes optical to electrical signal converting means for converting, into electrical signals, optical signals transmitted through said plurality of first optical transmission mediums, adding means for adding said electrical signals converted by said optical to electrical converting means, electrical to optical converting means for converting said added electrical signal into an optical signal, and supplying means for supplying the optical signal converted by said electrical to optical converting means to each of said plurality of second optical transmission mediums.

10. A low power private branch radio communication system, comprising:
   a first portable radio transmitter, located in a first area within a given premises, for modulating a signal and outputting the modulated signal as a radio signal of limited power in the first area;
   a first repeater means, located in the first area, for receiving the radio signal transmitted from said radio transmitter and for outputting an optical signal corresponding to the signal received, said first repeater means including a first antenna for receiving said radio signal, and a light modulator for receiving, as a modulation signal, the signal received by said antenna and for converting said signal received into an optical signal;
   an optical transmission medium for transmitting the optical signal output from said first repeater to a second area within said premises;

a second repeater means, located in the second area, for receiving the optical signal output from said first repeater means and transmitted by said optical transmission medium, and for generating a radio signal of limited power corresponding to the signal received in the second area, said second repeater means including a photo detector for detecting said optical signal and a second antenna for outputting the signal detected by said photo detector as a radio signal;

a second portable radio receiver, located in the second area, for receiving the radio signal output from said second repeater in the second area and demodulating the signal received; and wherein output powers of each of the radio signals emitted from radio transmitters of the system do not exceed an intensity, at a position of 3 meters from the corresponding transmitter, of a few hundred microvolts per meter.

11. A system according to claim 10, wherein:

the output powers of each of the radio signals of the system are limited to below a power level which provides a field intensity of less than 500 microvolts per meter at 3 meters distance from the corresponding radio transmitter source.

* * * * *